United States Patent
Aggarwal et al.

(10) Patent No.: US 11,625,947 B1
(45) Date of Patent: Apr. 11, 2023

(54) SYSTEM FOR DETECTING AND MITIGATING FRAUDULENT BIOMETRIC INPUT

(71) Applicant: AMAZON TECHNOLOGIES, INC., Seattle, WA (US)

(72) Inventors: Manoj Aggarwal, Seattle, WA (US); Brad Musick, Seattle, WA (US); Gerard Guy Medioni, Seattle, WA (US); Rui Zhao, Bellevue, WA (US); Zhen Han, Issaquah, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/807,976

(22) Filed: Mar. 3, 2020

(51) Int. Cl.
*G06K 9/00* (2006.01)
*G06V 40/12* (2022.01)
*G06V 40/50* (2022.01)
*G06V 40/13* (2022.01)

(52) U.S. Cl.
CPC ...... *G06V 40/1394* (2022.01); *G06V 40/1312* (2022.01); *G06V 40/1318* (2022.01); *G06V 40/1388* (2022.01); *G06V 40/50* (2022.01)

(58) Field of Classification Search
CPC ............. G06K 9/0012; G06K 9/00114; G06K 9/0004; G06K 9/00033; G06K 9/00926; G06K 40/1394; G06K 40/1312; G06K 40/1318; G06K 40/1388; G06K 40/50
See application file for complete search history.

(56) References Cited

U.S. PATENT DOCUMENTS

| | | | | |
|---|---|---|---|---|
| 9,904,914 | B1* | 2/2018 | Bent, II | G06Q 20/3827 |
| 2012/0230555 | A1* | 9/2012 | Miura | G06K 9/00926 |
| | | | | 382/124 |
| 2014/0270409 | A1* | 9/2014 | Hanna | G06Q 20/20 |
| | | | | 382/118 |
| 2016/0070967 | A1* | 3/2016 | Du | G06T 7/32 |
| | | | | 382/124 |
| 2017/0289168 | A1* | 10/2017 | Bar | G06F 21/316 |
| 2019/0392189 | A1* | 12/2019 | Kumar | G06K 9/2018 |
| 2020/0005019 | A1* | 1/2020 | Liu | G06K 9/0012 |
| 2020/0201967 | A1* | 6/2020 | Maxwell | G06K 9/00288 |

* cited by examiner

*Primary Examiner* — Abhishek Sarma
(74) *Attorney, Agent, or Firm* — Lindauer Law, PLLC (57) ABSTRACT

Biometric input, such as images of a hand obtained by a biometric input device, may be used to identify a person. An attacker may attempt to gain access by presenting false biometric data with an artificial biometric model, such as a fake hand. During a suspected attack, the attacker is prompted for additional data. For example, email address, telephone number, payment information, and so forth. This provides additional information about the attack while prolonging the time spent by the attacker on the attack. Information explicitly indicating failure is delayed or not presented at all. Data associated with an attack is placed into an exclusion list and further analyzed to recognize and mitigate future attacks. A subsequent attempt that corresponds to exclusion data proceeds with presenting prompts, gathering further information and consuming more of the attacker's time and resources.

20 Claims, 4 Drawing Sheets

SYSTEM FOR DETECTING AND MITIGATING FRAUDULENT BIOMETRIC INPUT

BACKGROUND

A system may identify a user based on biometric data acquired by an input device. An attacker may attempt to subvert the system.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Accurate and fast identification of a user provides useful information that may be used in a variety of ways. For example, authorization to pay, entry to a material handling facility (facility), office, transportation facility, or other location may be controlled based on user identity, and so forth. A user may be identified using one or more characteristics of the particular individual that are difficult or impossible to copy or be transferred. For example, a biometric identification system may use an input device to acquire biometric data about biometric features on a palm, finger, face, and so forth. The biometric identification system may enroll a user. During enrollment, an input device is used to acquire biometric data about the user, and that biometric data is associated with a user identifier, an account identifier, and so forth.

An attacker may attempt to subvert an identification system that uses biometric input. For example, the attacker may construct an artificial biometric model of a hand of a previously enrolled user, and present that to the input device in an attempt to usurp the identity of the enrolled user. In other examples, the attacker may attempt to enroll a fictitious user, enroll an unsuspecting person, and so forth.

Described in this disclosure are techniques and systems to detect and mitigate fraudulent biometric input provided by an input device. During an attempted identification by a biometric system, an input device provides transaction data to one or more computing devices. This transaction data includes biometric input and non-biometric data. For example, the biometric input may comprise multi-modal images of a hand. In one implementation, the input device may comprise a scanner that generates the multi-modal imagery of a user's hand. The multi-modal imagery may depict surface features of the hand and internal features of the hand such as veins. Continuing the example, the non-biometric data may comprise a device identifier, order data, and so forth.

The non-biometric data may be assessed to determine a first fraud metric value. The first fraud metric value is indicative of a likelihood that the non-biometric data is representative of a fraudulent transaction. For example, transaction data that indicates a device identifier or payment data listed in exclusion data may be indicative of a fraudulent transaction.

The biometric input may be assessed to determine a liveness metric value. The liveness metric value is indicative of a likelihood that the biometric input was obtained from a live person. In one implementation the liveness metric value may be determined by processing the biometric input with a first neural network that is trained to recognize live hands.

The biometric input is processed to generate a feature vector (FV). The FVs are representative of one or more features depicted in the biometric input. In one implementation a second neural network may be trained to generate FVs suitable for identification.

The FV obtained from the biometric input is compared to one or more of exclusion data or inclusion data to determine a second fraud metric value. In one implementation, a similarity value may be determined that is indicative of the similarity between the FV and previously stored FVs in one or more of the exclusion data or the inclusion data. For example, the similarity value may comprise a Euclidean distance between the two FVs in the vector space. The second fraud metric value may comprise the similarity value with respect to a closest FV in the exclusion data. For example, the second fraud metric value may be calculated as an inverse value of the Euclidean distance in vector space of the FV from the biometric input with respect to a second FV stored in the exclusion data.

The metric values may be used to determine if the transaction data is likely to be associated with a fraudulent incident. In one implementation, the first fraud metric value, the liveness metric value, and the second fraud metric value may be used to calculate a third fraud metric value. For example, the calculation may include a sum of all the values, a weighted average of all the values, and so forth.

If the transaction data is deemed to be representative of a fraudulent incident, such as if the third fraud metric value is greater than a threshold value, the system proceeds to prompt for additional information from the attacker. For example, instead of presenting a notification of failure to the user, one or more prompts are provided requesting additional information. The requested information may include telephone numbers, names, address information, payment data, and so forth. As the user continues to respond, additional prompts may be provided.

The presentation of additional prompts, rather than presenting notification of a failure, produces significant benefits that improve security of the system. By prompting the user in a transaction that is deemed to be suspect, rather than providing the notification of failure, the interaction is prolonged. By prolonging the interaction, the attacking user is unable to quickly test different attacks. As a result, the additional prompts serve to introduce a delay that renders an attack expensive in terms of times and resources to conduct.

The prompts and any resulting reply data that is provided may be subsequently used to facilitate detection of future attacks. For example, an attacker may try an attack with a simulated hand that has a liveness metric value less than a threshold. Instead of notifying the attacker of the failure, a prompt is presented for additional information. For example, "please enter your telephone number." If the attacker provides a reply, the resulting reply data may be stored and used. Continuing the example, the attacker may make multiple attempts, each with a different simulated hand, but using the same telephone number. By gathering this information, future attempts that use the same telephone number may be associated with one another, providing a connection between the attempts.

The delay also affords the system time to recognize the potential attack from multiple sources very quickly, allowing mitigation actions to begin more quickly. For example, the time taken between the prompts may be used to update backend databases, search exclusion data, initiate a two-factor-authentication process, notify a responsible party, and so forth. Continuing the example, if an attacker presents a simulated hand at a first input device and receives a prompt to enter a phone number, a human attendant may be notified and dispatched to the first input device to address the situation. Likewise, by maintaining the exclusion data and comparing subsequent attempts to this exclusion data, attacks occurring over longer periods of time such as hours or days are more readily detected.

By using the system and techniques described in this disclosure, security of a biometric identification system is substantially improved. Attacks may be detected, and when detected, are prolonged resulting in a significant resource expenditure by the attacker. Should the attacker continue to try, additional information is gathered that may be used to detect future attacks.

Illustrative System

Figure 1:
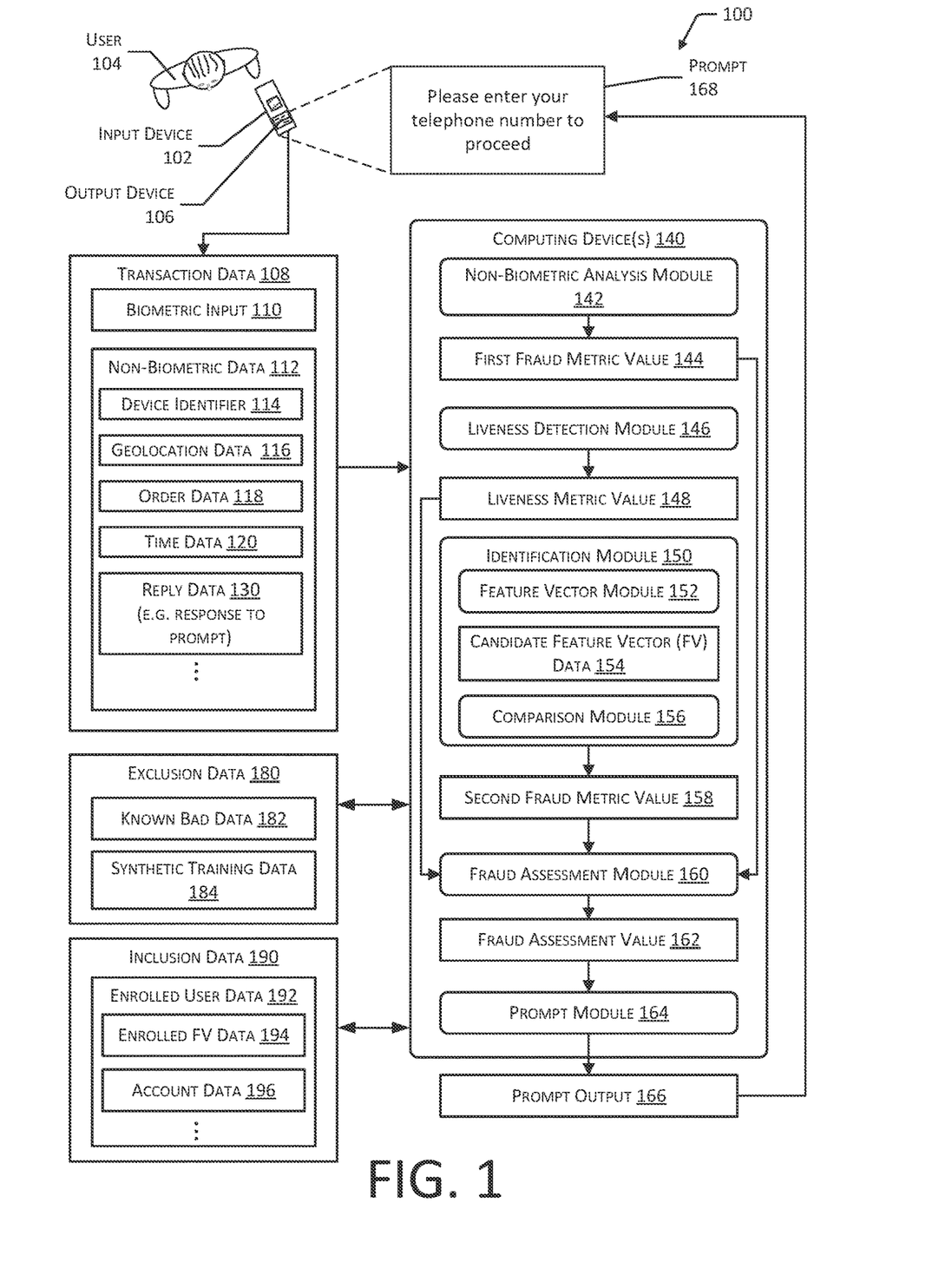
FIG. 1 illustrates a system to detect and mitigate fraudulent input to a system that uses biometric data to identify a user, according to some implementations.

A system 100 is depicted that includes an input device 102 that may be used by a user 104. The input device 102 may comprise one or more processors, sensors, one or more output devices 106 such as a speaker or display device, a communication interface, and so forth. An implementation of the input device 102 is discussed with regard to FIG. 3. During operation the input device 102 may provide transaction data 108 to one or more computing devices 140.

The transaction data includes biometric input 110 and non-biometric data 112. In one implementation the biometric input 110 may comprise multi-modal image data. In other implementations the biometric input 110 may comprise point cloud data, acoustic data, and so forth.

The non-biometric data 112 may include a device identifier 114, geolocation data 116, order data 118, time data 120, reply data 130, and so forth. The device identifier 114 provides information that distinguishes the specific input device 102 from other input devices 102 in communication with the one or more computing devices 140. For example, the device identifier 114 may consist of a device serial number assigned during manufacture.

The geolocation data 116 may provide information indicative of a geographic location of the input device 102. In one implementation the input device 102 may include a global positioning system (GPS) receiver that generates the geolocation data 116. In another implementation, the input device 102 may have a network interface that receives information such as network identifiers, media access control addresses, and the geolocation data 116 may be determined based on this information. In another implementation, the geolocation data 116 may be manually entered into the input device 102. For example, during provisioning of the input device 102 geolocation data 116 may be sent to the input device 102 for storage.

In some implementations at least a portion of the transaction data 108 may be stored by the one or more computing devices 140. For example, the geolocation data 116 may be determined by the one or more computing devices 140. Continuing the example, data may be stored that associates the geolocation data 116 with the device identifier 114.

The order data 118 may comprise information associated with an order, purchase, pickup, entry, exit, and so forth. For example, the order data 118 may comprise a quantity, item identifier, and cost of items that are to be purchased.

The time data 120 is indicative of a time associated with data in the transaction data 108. For example, the time data 120 may indicate a timestamp of when biometric input 110 was acquired.

The transaction data 108 may also include reply data 130. The reply data 130 may comprise information provided by a user 104 in response to a prompt 168 as discussed in more detail below.

An identification session may be deemed to begin when the input device 102 initiates the identification process, such as acquiring biometric input 110, and may be deemed to conclude when identification is successful or after an interval of no further responses to prompts 168 being received.

During an identification session, the input device 102 acquires the biometric input 110 and generates, retrieves, or receives the non-biometric data 112. The transaction data 108, or portions thereof, are sent to the one or more computing devices 140.

The one or more computing devices 140 may include one or more modules. The modules may comprise instructions executing on one or more processors, hardware configured to perform a specified function, and so forth. The data transferred between the input device 102 and the one or more computing devices 140 may be encrypted. The data transferred between individual computing devices of the one or more computing devices 140 may be encrypted.

During operation, the one or more computing devices 140 may utilize exclusion data 180 and inclusion data 190. The exclusion data 180 may include known bad data 182 and in some implementations synthetic training data 184. The known bad data 182 may comprise information associated with or obtained from previous attacks. The synthetic training data 184 may comprise synthesized data. The exclusion data 180 is discussed in more detail below.

The inclusion data 190 may include enrolled user data 192. A user 104 may be enrolled and their information stored in the inclusion data 190 when their attempted access of the system is not determined to be fraudulent by the system. The enrolled user data 192 may include enrolled feature vector (FV) data 194, account data 196, and so forth. The inclusion data 190 is discussed in more detail below.

The one or more computing devices 140 may provide a non-biometric analysis module (NBAM) 142. The NBAM 142 assesses the non-biometric data 112 to determine a first fraud metric value 144. In some implementations the NBAM 142 may compare non-biometric data 112 or values derived therefrom with predetermined thresholds. The non-biometric data 112 from a plurality of sessions may be compared. For example, if the non-biometric data 112 indicates that the same device identifier 114 is associated with more than one identification session at a time, fraud may be suspected and the first fraud metric value 144 may be increased. In another example, the order data 118 may be compared with previously received order data 118 to determine if the transaction is inconsistent with previous transactions, in which case fraud may be suspected. In some implementations the NBAM 142 may comprise a neural network that is trained to generate the fraud metric value 144.

The NBAM 142 may also compare the non-biometric data 112 to previously stored data. The exclusion data 180 may comprise known bad data 182 obtained from previous attempts to attack the system 100 or from other sources. For example, the exclusion data 180 may store as known bad data 182 the transaction data 108 from previous attacks.

The NBAM 142 may compare the transaction data 108 received during an identification session with the previously stored known bad data 182 to determine the first fraud metric value 144. For example, the known bad data 182 may be assessed to determine that a particular geolocation is associated with a majority of attack attempts. Subsequent transaction data 108 that is also associated with that particular geolocation may be associated with an increased first fraud metric value 144.

A liveness detection module 146 processes at least a portion of the biometric input 110 to determine a liveness metric value 148. The liveness metric value 148 is indicative of a likelihood that the biometric input 110 is obtained from a live person. For example, a living human hand may experience changes in features due to muscular tremors, cardiac pulse, environmental response, and so forth. The liveness detection module 146 may determine the presence of the changes or other features to assess whether a live person is being scanned. In one implementation the liveness detection module 146 may utilize a trained neural network to determine the liveness metric value 148.

An identification module 150 may include a feature vector module 152 to determine candidate feature vector (FV) data 154 from the biometric input 110. The candidate FV data 154 comprises one or more feature vectors that are representative of one or more features depicted in the biometric input 110. In some implementations the identification module 150 may process the biometric input 110 to produce a canonical representation of the multi-modal images acquired by the input device 102. For example, the canonical representation may apply one or more transforms to the biometric input 110 so that the resulting canonical image(s) depict the image of a hand in a particular orientation, particular articulation of the joints, particular illumination, and so forth. The resulting canonical representations may be used by the subsequent modules. For example, the feature vector module 152 may use the canonical representation to determine the candidate FV data 154.

The feature vector module 152 may use one or more classifiers, neural networks, scale-invariant feature transform (SIFT), and so forth to determine feature vectors representative of features depicted in the biometric input 110 or canonical representation thereof. In some implementations information about the transforms or transform parameters used to generate the canonical representation may also be provided as input to the feature vector module 152.

A comparison module 156 may compare the candidate FV data 154 with previously stored feature vectors in one or more of the exclusion data 180 or the inclusion data 190. A similarity value may be determined that is indicative of similarity between the candidate FV data 154 and previously stored FV data. For example, the similarity value may be determined based on a Euclidean distance in the vector space between the candidate FV data 154 and a FV stored in the exclusion data 180 or inclusion data 190. In other implementations, other techniques may be used to compare feature vectors.

The identification module 150 may generate a second fraud metric value 158. The second fraud metric value 158 may be based at least in part on one or more similarity values and whether the similarity is with FV data stored in the exclusion data 180 or the inclusion data 190. For example, if the candidate FV data 154 exhibits a similarity value of 0.99 to a FV stored in known bad data 182, the second fraud metric value 158 may be greater than a threshold value indicative of fraud. In another example, if the candidate FV data 154 exhibits a similarity value of 0.99 to enrolled FV data 194 in the inclusion data 190, the second fraud metric value 158 may be less than the threshold value indicative of fraud.

A fraud assessment module 160 may receive as input one or more of the first fraud metric value 144, the liveness metric value 148, or the second fraud metric value 158 and generates as output a fraud assessment value 162. In one implementation, the first fraud metric value 144, the liveness metric value 148, and the second fraud metric value 158 may be used to calculate the fraud assessment value 162. For example, the calculation may include a sum of all the values, a weighted average of all the values, and so forth. In some implementations the metric values may comprise feature vectors, such as generated by artificial neural networks. For example, instead of a single numeric value, the first fraud metric value 144 may comprise a vector value.

The fraud assessment value 162 may be representative of whether the identification session associated with the transaction data 108 is deemed fraudulent. For example, if the fraud assessment value 162 is greater than a threshold value, the identification session may be deemed fraudulent. In some implementations the fraud metric values may vary during an identification session. For example, if reply data 130 fails a verification test, the first fraud metric value 144 may increase from one time to another. Continuing the example, if a series of reply data 130 matches a verification test, the first fraud metric value 144 may decrease from one time to another.

In some implementations an authorized operator may be used. In one implementation, if one or more of the fraud metric values or the liveness metric value 148 are less than a threshold value, a human operator may be consulted to determine whether to permit the identification session. For example, if a liveness metric value 148 is less than a threshold value, a human attendant may be dispatched to assist the user 104 at the particular input device 102. Continuing the example, the human attendant may note that the user 104 is wearing winter gloves and may suggest that the user 104 remove the gloves in order to proceed. In another example, if the attendant notes the user 104 attempting to use an artificial biometric model to subvert the system 100, the attendant may provide input to the system 100 and the transaction data 108 associated with that identification session may be stored in the exclusion data 180.

The prompt module 164 may determine prompt output 166 based on one or more inputs, such as the fraud assessment value 162. In one implementation, if the fraud assessment value 162 is greater than a threshold value, the prompt module 164 may determine prompt output 166. The prompt output 166 may comprise one or more instructions that instruct the input device 102 or a device associated with the input device 102 to present a prompt 168 using an output device 106. The prompt output 166 may comprise information for presentation as the prompt 168 such as text or graphics, or may refer to previously stored information.

The prompt output 166 results in the prompt 168 being presented on an output device 106. The output device 106 may be included in the input device 102. For example, the output device 106 may comprise a display screen or speaker on the input device 102. The output device 106 may be associated with the input device 102. For example, the output device 106 may be a network connected display device or speaker that is near the input device 102.

The prompt output 166 may include one or more of a request for an email address, a request for a telephone number, a request for a name, a request for an account login name, a request for a mailing address, a request for a physical address, a request for a payment account number, a request for an electronic communication address, a request for a password, or a request to select one or more responses from a set of proposed responses. In other implementations, other information may be requested in the prompt output 166.

The prompt 168 may be provided with a user interface that allows the user 104 to provide as input reply data 130. For example, if the prompt 168 is "please enter your telephone number to proceed" a graphical user interface may present an input box allowing entry of a telephone number using a touchscreen. The reply data 130 may comprise the input as received by the user interface.

During an identification session that is deemed to be fraudulent, the prompt module 164 may continue to present prompts 168 soliciting additional information from the user 104 who is a potential attacker. The prompts 168 may be presented in series, such that reply data 130 is required to be entered before a successive prompt 168 is presented. A time interval between successive prompts 168 may be constant, increased with each prompt, or random. The time interval may be measured from the time the prompt 168 is presented, receipt of corresponding reply data 130, and so forth. For example, a first prompt 168 may be presented at time t=1. After reply data 130 that is responsive to the first prompt 168 is received at time t=2, the prompt module 164 may delay sending or presenting a second prompt 168 until a specified time interval has expired. In one implementation, the time interval between prompts 168 may be randomized within a specified range.

In some implementations, the reply data 130 may be assessed at the input device 102 to comply with data validation rules. For example, a telephone number for North America would be validated to include 10 digits. In another example, user input to a prompt 168 to enter a first name would be validated to contain only non-numeric characters before being sent as the reply data 130.

In another implementation, data validation rules may be suspended during a suspected attack. For example, the prompt output 166 may relax or discontinue data validation checks to input provided in response to the prompt 168. As mentioned below, this action may prolong the attack and consume the attacker's resources while also providing information about the attacker.

In yet another implementation, data validation rules and the corresponding response in the user interface may be modified during a suspected attack. For example, if a first entered telephone number is not ten digits, a pause may be inserted before the user interface presents the input box again. This delay further prolongs the attack, expending the attacker's resources.

By presenting one or more prompts 168 after the identification session has been deemed likely to be fraudulent, several benefits accrue. The process of presenting the prompts 168 and waiting for reply data 130 to be provided slows down the pace of an attack, prolonging the attack. By prolonging the attack, the attacking user 104 is forced to expend additional time and consume additional resources to maintain the attack.

The reply data 130 that is received provides information about the attacker. This information may be used to determine future attacks. For example, an attacker may attempt to use the same credit card number or telephone number while trying to create an enrollment using an artificial biometric model.

In some implementations the prompt module 164 may present prompts 168 in a different order. For example, a prompt 168 to be presented may be selected randomly from a set of predetermined prompts 168. By presenting the prompts 168 in different order, the attacker is forced to interpret those prompts 168 in order to proceed, precluding the use of strictly scripted attacks using a predetermined set of responses. The time interval between successive prompts may be constant, increased with successive prompts, or randomized.

The known bad data 182 may include the feature vector data obtained from the biometric inputs 110 associated with fraudulent attacks. For example, the candidate FV data 154 determined from biometric input 110 that has a liveness metric value 148 less than a threshold value may be stored in the known bad data 182.

The known bad data 182 may be used to generate synthetic training data 184. The synthetic training data 184 may be used for training one or more neural networks of the system 100. For example, the FV data stored in the known bad data 182 may be used as input to a generative adversarial network (GAN) that produces synthetic bad known FVs. In this way, the system 100 is more likely to determine an attack in which an adversary is changing the artificial biometric model being presented.

An identification session for a user 104 attempting to enroll to be identified by the system 100 may be assessed by the one or more computing devices 140 as described above. For example, if the liveness metric value 148 is greater than a first threshold value, the first fraud metric value 144 is less than a second threshold value, and the second fraud metric value 158 is less than a third threshold value, the transaction data 108 may be used to generate enrolled user data 192. For example, the candidate FV data 154 may be stored as enrolled FV data 194 that is associated with account data 196. The account data 196 may include information such as an account identifier, name, contact information, payment account data, and so forth.

Likewise, an identification session for a previously enrolled user 104 may be assessed as described above. For example, an attacker may scan an artificial biometric model using an input device 102 at a first geolocation. The artificial biometric model may attempt to replicate the features on a hand of the enrolled user, but fails the liveness detection by the liveness detection module 146. Also, the geolocation of the input device 102 may not correspond to previous activity of the user 104. For example, the input device 102 used to perpetrate the attack may be in Medicine Hat, Alberta while the user 104 lives in Jacksonville, Fla.

In some implementations the one or more computing devices 140 may be used to provide a notification to an interested party about a possible attempt to fraudulently use their information. For example, the exclusion data 180 may be compared to the inclusion data 190. If the reply data 130 includes a payment account number that is the same as a payment account number stored in the account data 196, a notification may be sent to a representative of the authorized account indicated by the account data 196.

Figure 2:
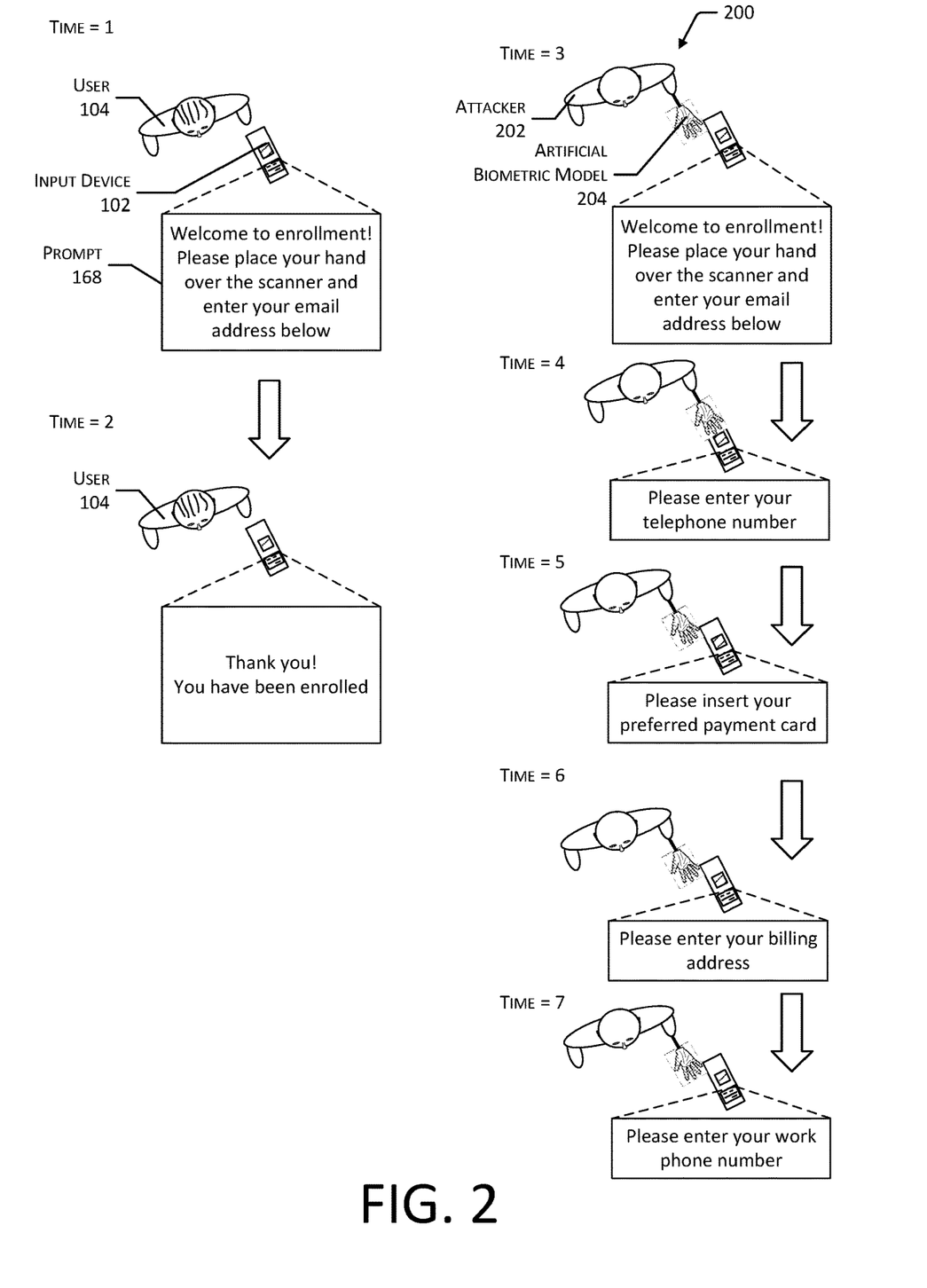
FIG. 2 illustrates system interactions for a user on an inclusion list and an attacker, according to some implementations.

FIG. 2 illustrates at 200 system interactions for a user 104 and an attacker 202, according to some implementations. At time=1, the user 104 approaches the input device 102 to enroll to use the system 100. The input device 102 presents a prompt 168 with an output device 106 requesting the user 104 place their hand over a scanner and to enter their email address.

The input device 102 generates first transaction data 108, including first biometric input 110. The one or more computing devices 140 process the first transaction data 108 and determine that a fraudulent session is unlikely. At time=2 the enrollment completes, and enrolled user data 192 associated with the user 104 is generated. For example, the enrolled user data 192 may include the enrolled FV data 194 associated with the first biometric input 110 and account data 196. In some implementations other interactions may take place during enrollment, such as a two-factor authentication process. For example, a cellular telephone number may be retrieved based on the email address entered. A confirmation message may be sent using SMS to the cellular telephone using the cellular telephone number. The user 104 may confirm the enrollment request using the cellular telephone.

In comparison, at time=3 an attacker 202 approaches the input device 102 to create a fraudulent enrollment. As before, the input device 102 presents a prompt 168 with an output device 106 requesting the hand be placed over a scanner and to enter an email address. The attacker 202 attempts to use an artificial biometric model 204 at the input device 102. The artificial biometric model 204 may comprise a physical article or an electronic presentation. The input device 102 generates second transaction data 108, including second biometric input 110.

The one or more computing devices 140 process the second transaction data 108 and determine that a fraudulent session is likely. For example, the artificial biometric model 204 may have a liveness metric value 148 less than a threshold value, the candidate FV data 154 may be too similar to exclusion data 180, the candidate FV data 154 may be too similar to previously enrolled FV data 194 stored in the inclusion data 190, and so forth.

Instead of presenting a notification that a failure has been detected, the prompt module 164 provides one or more prompts 168. For example, at time=4 the attacker 202 is asked to provide a telephone number. At time=5 the attacker 202 is asked to provide a preferred payment card. At time=6 the attacker 202 is asked to enter a billing address. At time=7, the attacker 202 is asked to enter a work phone number. The prompt module 164 may continue to send prompt output 166 to cause the output device 106 to present prompts 168. The responses to these prompts 168 are the reply data 130.

The prompt module 164 may continue presenting prompts 168 to the attacker 202. Ultimately the attacker 202 may lose patience and terminate the attack by not responding. The system 100 may timeout and close an identification session if reply data 130 to a prompt 168 is not received within a threshold amount of time.

Security of the system 100 is significantly improved because the attacker 202 is thus forced to prolong the attack and provide information, without being explicitly informed that a likely attack has been detected. By prolonging the attack the attacker 202 consumes more time and other resources in attempting the attack. Additionally, the reply data 130 provides additional information that may be further used to detect future attacks.

Figure 3:
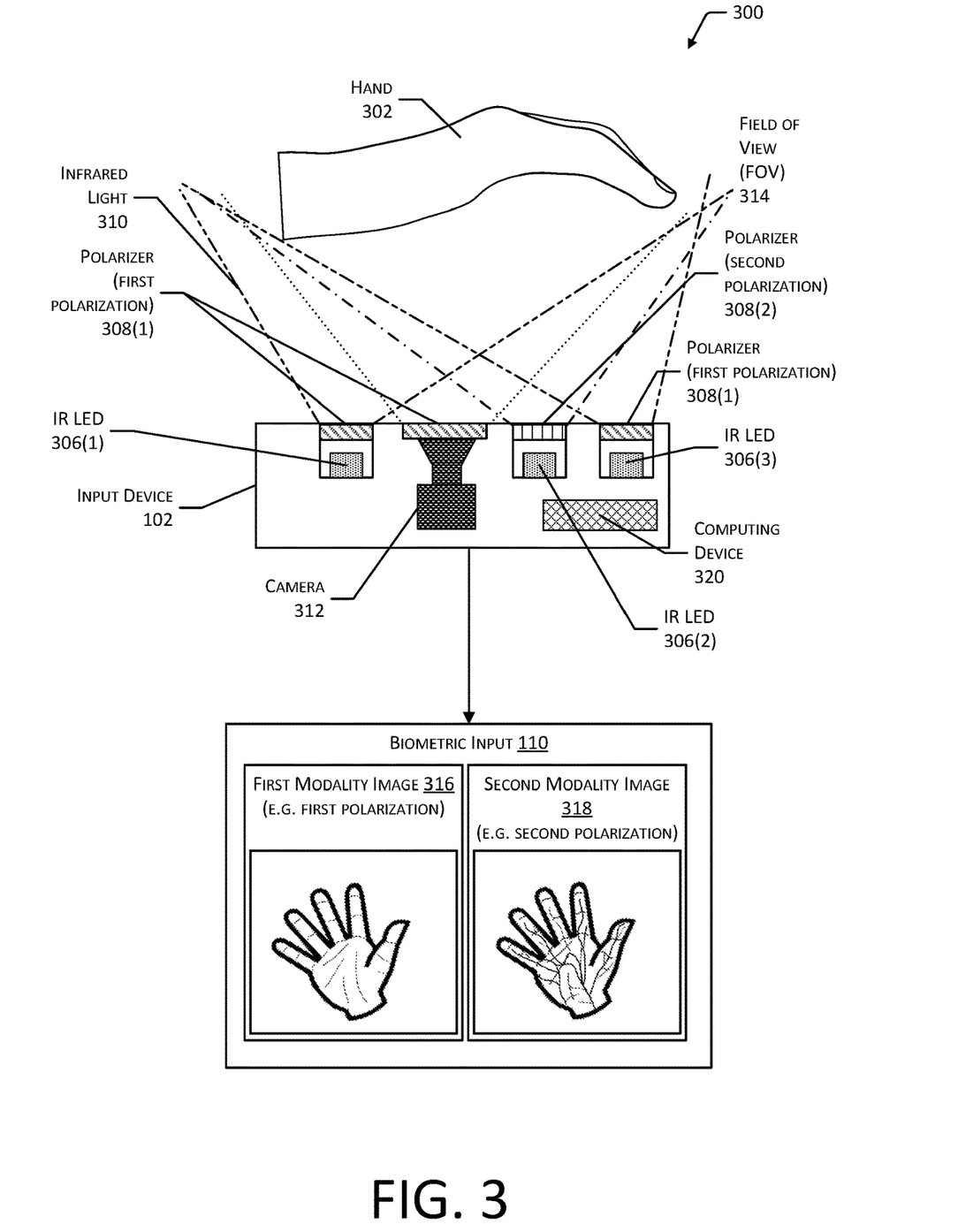
FIG. 3 illustrates an input device that acquires biometric input comprising images of a user's palm with different modalities, according to some implementations.

FIG. 3 illustrates at 300 one implementation of the input device 102 that acquires biometric input 110 comprising different modalities. For example, the biometric input 110 may comprise multi-modal images of a user's 104 hand 302. A hand 302 of the user 104 is positioned above the input device 102. The input device 102 may include one or more infrared (IR) light sources. For example, a first set of IR light emitting diodes (LEDs) 306(1), a second set of IR LEDs 306(2), and a third set of IR LEDs 306(3) are shown. In other implementations other devices may be used to generate infrared light 310. In some implementations, the wavelength of the IR light 310 may be 850 nanometers (nm).

The IR LED 306(1) is arranged adjacent to a first polarizer 308(1), such that IR light 310 produced by the IR LED 306(1) passes through the first polarizer 308(1). The IR light 310(1) that passes through the first polarizer 308(1) substantially exhibits a first polarization. Likewise, the IR LED 306(3) is arranged adjacent to a first polarizer 308(1). The input device 102 includes a camera 312 that may also have a first polarizer 308(1), such that infrared light captured by the camera 312 substantially exhibits the first polarization. In one implementation, the camera 312 with the first polarizer 308(1) may produce the first modality image 316 when the hand 302 is illuminated by the light from the IR LED 306(1) with the first polarizer 308(1) that exhibits the first polarization.

In some implementations, a plurality of IR LEDs 306 with their respective polarizers 308 may be arranged at different locations in the input device 102 relative to the camera 312. For example, four IR LEDs 306 with the first polarizers 308(1) may be arranged with one IR LED 306 at each corner of a square that is centered on the camera 312. In another implementation, the IR LEDs 306 and the polarizers 308 may form a ring around the camera 312. During operation, a computing device 320 or controller of the input device 102 may operate the IR LEDs 306 individually or in groups to produce illumination that is either uniform or from a particular direction at different times. For example, during acquisition of first modality images 316, the IR LEDs 306 may be controlled to be all on during acquisition of one image at a first time. At a second time selected IR LEDs 306, such as those in a particular corner of the square, may be controlled to be on during another image at a second time. By selectively illuminating the hand 302, external characteristics of the hand 302 such as ridges or creases may be enhanced due to shadow or other effects. For example, the controller of the input device 102 may be configured to acquire one image using all IR LEDs 306 with the first polarization, then four images, each using one of four IR LEDs 306, each at a different location with respect to the camera 312, followed by an image with the IR LED 306 that produces IR light 310 with a second polarization.

The input device 102 includes a second IR LED 306(2) that is arranged adjacent to a second polarizer 308(2), such that the IR light 310 produced by the second IR LED 306(2) passes through the second polarizer 308(2) substantially exhibits a second polarization. In one implementation, the camera 312 may produce a second modality image 318 when the hand 302 is illuminated by the light from the IR LED 306(2) that exhibits the second polarization. A field of view (FOV) 314 indicates a region which is illuminated by the IR LEDs 306 and from which images from the camera 312 may be obtained. In implementations involving multiple cameras 312, the FOV 314 is inclusive of the individual FOV of each of the cameras 312. For example, the FOV of each of the cameras 312 may overlap.

During operation, a computing device 320 or controller of the input device 102 may operate the IR LEDs 306 that produce IR light 310 with the different polarizations and the camera 312 to acquire images of the hand 302 as illuminated by the different polarizations of light. For example, at a first time the IR LED 306(1) may be active and the camera 312 acquires the biometric input 110. Continuing the example, at a second time the IR LED 306(1) may be inactive, the IR LED 306(2) may be active, and the camera 312 acquires the biometric input 110. The resulting biometric input 110 may then comprise a stream of first modality image 316(1), second modality image 318(1), first modality image 316(2), second modality image 318(2), and so forth.

The camera 312 may comprise detectors that are responsive to at least the IR light 310 being used. The camera 312 may be able to generate imagery at various frame rates. For example, the camera 312 may be able to generate an image every ½₀ of a second or faster, having a frame rate of 30 frames per second (FPS). An integration time (or exposure time) of the cameras 312 specifies the amount of time that photons are measured by the detectors to generate a single image. As the integration time decreases, the system may be less prone to blurring due to motion of the hand 302.

In some implementations a polarized light source may be used, and the polarizer 308 adjacent to the light source omitted. For example, a quantum dot may emit IR light with a particular polarization. Likewise, in some implementations the camera 312 may include a detector that is sensitive to, or provides information indicative of, polarization of captured light, and the polarizer 308 omitted.

The polarizer 308 may comprise a filter that is substantially transmissive to light of a particular polarization, while substantially absorbing or reflecting light with another polarization. The polarization may be one or more of linear or circular. For example, the first polarization may be linear while the second polarization may be circular. In another example, the first polarization may be linear with a first angle and the second polarization may be linear with a second angle. When linear polarization is used, the first polarization and the second polarization may be perpendicular to one another. For example, the first polarization may exhibit a first angle of 0 degrees with respect to a particular reference point, while the second polarization exhibits a second angle of 90 degrees.

The polarizer 308 may comprise a dichroic material or structure that passes light with a linear polarization. For example, the polarizer may comprise aligned polyvinylene chains, silver nanoparticles embedded in a transparent substrate such as glass, and so forth. In other implementations, other polarization devices may be used, including but not limited to wire-grid polarizers, beam-splitting polarizers, quarter-wave plates, liquid crystals, photoelastic modulators, and so forth. For example, the photoelastic modulator may comprise a device that is controlled by an electrical signal which drives a piezoelectric transducer to vibrate a half wave resonant bar, such as fused silica. By changing the frequency of the signal, the frequency of the vibration produced by the transducer is changed, and the polarization of light through the resonant bar may be selected.

In another implementation (not shown) the input device 102 may use a light source such as one or more IR LEDs 306 and a camera 312. A wheel comprises two or more segments with polarization windows. For example, the wheel may comprise a first segment with first polarization window having a first polarizer 308(1) that passes light with a first polarity and a second segment with second polarization window having a portion that is a first polarizer 308(1) that passes light with the first polarity and a second polarizer 308(2) that passes light with a second polarity. An electric motor rotates the wheel to place a particular segment in front of the IR LED 306 and the camera 312 at a particular time. For example, the rotation of the wheel may be synchronized to the frame rate of the camera 312, such that at a first time the IR light 310 from the IR LED 306 passes through the first polarization window, resulting in IR light 310 with a first polarization. That light interacts with an object, such as the hand 302, and the camera 312 with a FOV through the first polarization windows detects light passing through the first polarization window and produces a first modality image 316. The first modality may thus involve using the same polarization for the infrared light 310 and the camera 112. At a second time (not shown), the second segment places a first polarization window in front of the camera 312 and a second polarization window in front of the IR LED 306, and the camera 312 produces a second modality image 318. The second modality may thus involve the infrared light 310 using a different polarization than the camera 112.

In another implementation (not depicted here) an electronically controlled device may be used to pass light with a particular polarization. For example, instead of the wheel, an electronically controlled polarizer 308 may be used to select a particular polarization at a particular time. For example, a polarized film with the first polarization 308(1) may be placed in front of the IR LEDs 306 while the electronically controlled device may be placed in front of the camera 312 to control which polarization of light reaches the detector of the camera 312 at a particular time.

In some implementations, instead of or in addition to different polarizations, different wavelengths of light may be used. For example, the IR LEDs 306 may provide illumination with a wavelength of between 740 nm and 1000 nm. In some implementations, different wavelengths may be used to illuminate the hand 302 at different times.

The input device 102 may include one or more controllers or computing devices 320. The computing device 320 may include a hardware processor, memory, and so forth. For example, the computing device 320 may comprise a microcontroller, system on a chip (SoC), single board computer, and so forth. The computing device 320 may be configured to operate the devices of the input device 102. For example, the computing device 320 may operate the IR LEDs 306, the polarizers 308 (where electronically controlled), the cameras 312, the motor driving a polarizer wheel, and so forth. For example, the computing device 320 may control the input device 102 such that biometric input 110 is generated that comprises first modality images 316 acquired at a first time using a first polarization of IR light 310 and second modality images 318 acquired at a second time using a second polarization of IR light 310.

In some implementations one or more of the functions of the system may be performed by the one or more computing devices 320. For example, the input device 102 may use the one or more computing devices 320 to implement.

In other implementations the relative arrangement of the hand 302 and the input device 102 may be changed. For example, the input device 102 may be oriented with a FOV 314 is pointed down. During use, the user 104 may position their hand 302 below the input device 102, in the FOV 314 with their palm opening upwards.

While the input device 102 is described as being used to acquire an image of the palm of the hand 302, the input device 102 may be used to acquire images of other portions of the user 104, such as of the back of the hand 302, face, and so forth. For example, the input device 102 may be arranged with a FOV 314 such that as a user 104 approaches a gate, biometric input 110 of their face is obtained that includes first modality images 316 of the face and second modality images 318 of the face.

Figure 4:
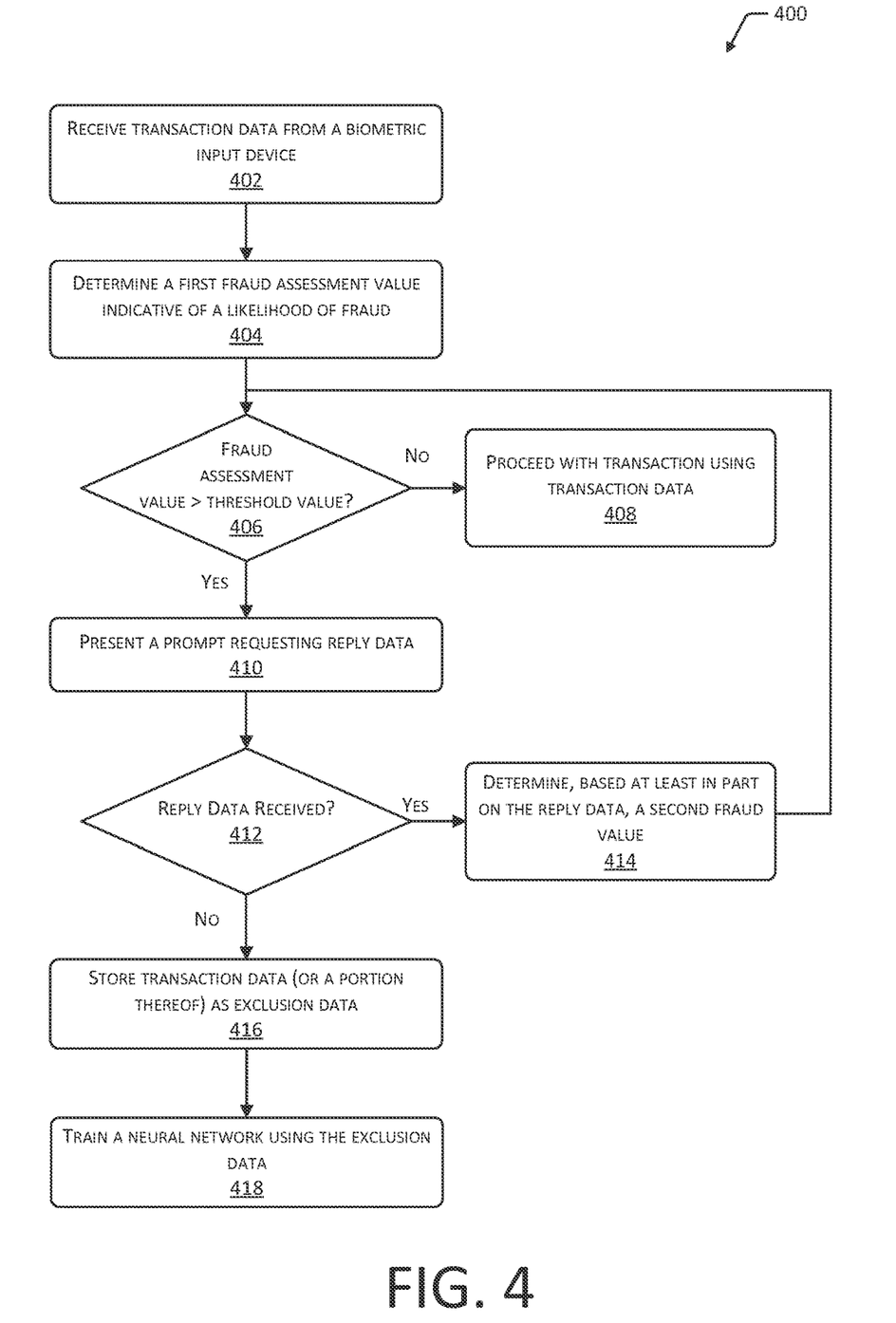
FIG. 4 is a flow diagram of a process to detect and mitigate an attacker, according to some implementations.

FIG. 4 is a flow diagram 400 of a process to detect and mitigate an attacker 202, according to some implementations. The process may be implemented at least in part by one or more of the input device 102, the one or more computing devices 140, or other devices.

At 402 transaction data 108 is received from a first device. For example, the first device may comprise the biometric input device 102.

At 404 a first fraud assessment value 162 is determined. For example, the fraud assessment module 160 may determine the first fraud assessment value 162 based on one or more of the non-biometric data 112, the biometric input 110, the exclusion data 180, or the inclusion data 190. This assessment facilitates the discovery and mitigation of attempts occurring over extended periods of time, such as hours, days, months, or years.

At 406 a determination is made as to whether the fraud assessment value 162 is greater than a threshold value. For example, the fraud assessment value 162 may be compared to a first threshold value. If no, the process proceeds to 408. If yes, the process proceeds to 410.

At 408 the transaction proceeds using the transaction data 108. For example, the transaction has been deemed unlikely to be fraudulent and the process such as enrollment, authorization to pay using a specified account, and so forth may be performed.

At 410 a prompt 168 requesting reply data 130 is presented by an output device 106 of one or more of the input device 102 or another device associated with the input device 102. For example, the prompt module 164 may generate prompt output 166 that is sent to the input device 102. The input device 102 may then present the prompt 168 using an output device 106 such as a display device, speaker, and so forth.

At 412 a determination is made as to whether the reply data 130 has been received. If yes, the process proceeds to 414. If no, the process proceeds to 416.

At 414 the reply data 130 may be used to determine a second fraud assessment value 162. For example, the reply data 130 may be compared to previously stored data, authenticated, verified, and so forth. The process may then return to 406 where the second fraud assessment value 162 is compared to the first threshold value. This accommodates situations where the reply data 130 reduces the likelihood of a session being fraudulent. For example, the reply data 130 may be used to further authenticate the user 104, include a two-factor authentication response, and so forth.

In some implementations a timeout interval may be specified for the determination of 412. For example, if reply data 130 is not received within a specified time of sending the prompt output 166, the process may proceed to 416.

At 416 the transaction data 108, or a portion thereof, is stored as the exclusion data 180. For example, the candidate FV data 154 resulting from the biometric input 110 and the reply data 130 may be stored as known bad data 182.

At 418 a machine learning system, such as an artificial neural network, may be trained using the exclusion data 180. For example, one or more of the known bad data 182 or the synthetic training data 184 may be used as inputs to train an artificial convolutional neural network (ACNN). The identification module 150 may use the trained ACNN to determine the second fraud metric value 158. In other implementations other machine learning systems may be trained using the exclusion data 180.

In some implementations an authorized operator may participate in the process. In one implementation, a human operator may be consulted to determine whether to permit the identification session. For example, if the fraud assessment value 162 has exceeded a threshold value and a minimum number of prompts 168 have been presented, a human attendant may be placed in communication with the user 104 or dispatched to assist the user 104.

The devices and techniques described in this disclosure may be used in a variety of other settings. For example, the system may be used in conjunction with a point-of-sale (POS) device. The user 104 may present their hand 302 to an input device 104 to provide an indication of intent and authorization to pay with an account associated with the account data 196. In another example, a robot may incorporate an input device 102. The robot may identify the user 104 as being associated with account data 196 authorized for delivery of a parcel to the user 104.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
    receiving first data from a first device at a first time, wherein the first data comprises first biometric input;
    determining, based on the first biometric input, a first feature vector;
    determining, based on the first data, a first value indicative of a likelihood of fraud;
    responsive to the first value exceeding a first threshold value, sending a first set of one or more prompt outputs to one or more of the first device or a second device that is associated with the first device;
    receiving a first set of reply data;
    storing as exclusion data one or more of the first data, the first feature vector, or the first set of reply data;
    receiving second data at a second time, wherein the second data comprises second biometric input; and
    determining, based on the second data and the exclusion data, a second value indicative of a likelihood of fraud.

2. The method of claim 1, further comprising:
    determining the second value is less than a second threshold value; and
    performing a transaction based at least in part on the first data.

3. The method of claim 1, further comprising:
    presenting a first prompt at a third time;
    receiving, at a fourth time, first reply data that is associated with the first prompt; and
    presenting, at a fifth time that is after the fourth time, a second prompt.

4. The method of claim 1, the first biometric input and the second biometric input comprising:
    a first modality image acquired using infrared light having a first polarization and a camera having a first polarizer; and
    a second modality image acquired using infrared light having a second polarization and the camera having the first polarizer.

5. The method of claim 1, wherein the second data is from a third device; and
    the determining the second value comprising:
        determining the first device is at a first geographic location at the first time;
        determining the third device is at a second geographic location at the second time;
        determining a first distance between the first geographic location and the second geographic location exceeds a second threshold value;
        determining, based on the second biometric input, a second feature vector;
        determining a similarity value indicative of similarity between the first feature vector and the second feature vector; and
        determining the similarity value exceeds a third threshold value.

6. The method of claim 1, wherein the second data is from a third device; and
    the determining the second value comprising:
        determining, based on the second biometric input, a second feature vector;
        determining a similarity value indicative of similarity between the first feature vector and the second feature vector;
        determining the similarity value exceeds a second threshold value;
        sending a second set of one or more prompt outputs to one or more of the third device or a fourth device that is associated with the third device;
        receiving a second set of reply data; and
        determining a correspondence between at least a portion of the first set of reply data and the second set of reply data exceeds a third threshold value.

7. The method of claim 1, the first set of one or more prompt outputs comprising one or more of:
    a request for an email address,
    a request for a telephone number,
    a request for a name,
    a request for an account login name,
    a request for a mailing address,
    a request for a physical address,
    a request for a payment account number,
    a request for an electronic communication address,
    a request for a password, or
    a request to select one or more responses from a set of proposed responses.

8. The method of claim 1, further comprising:
    determining at least a portion of the exclusion data corresponds to at least a portion of inclusion data, wherein the inclusion data is indicative of an authorized account; and
    sending a notification to a representative of the authorized account.

9. The method of claim 1, further comprising:
    generating, based on the first biometric input, a first set of synthetic training data; and
    training a first artificial neural network using the first set of synthetic training data.

10. The method of claim 1, further comprising:
    training a first artificial neural network with the exclusion data to generate a third value indicative of a likelihood of fraud.

11. A method comprising:
    receiving first data from a first device at a first time, wherein the first data comprises first biometric input;

determining, based on the first data, a first value indicative of a likelihood of fraud;

presenting a first set of prompts using one or more of the first device or a second device that is associated with the first device;

receiving a first set of reply data;

determining, based on the first biometric input, a first feature vector; and storing as exclusion data one or more of: the first data, the first feature vector, or the first set of reply data.

12. The method of claim 11, further comprising:

presenting a first prompt at a second time;

receiving, at a third time, first reply data that is associated with the first prompt; and presenting, at a fourth time that is after the third time, a second prompt.

13. The method of claim 11, the first biometric input comprising:

a first modality image acquired using infrared light having a first polarization and a camera having a first polarizer; and a second modality image acquired using infrared light having a second polarization and the camera having the first polarizer.

14. The method of claim 11, further comprising:

receiving second data from a third device at a second time, wherein the second data comprises second biometric input; and determining a second value indicative of a likelihood of fraud, the determining the second value comprising:

determining the first device is at a first geographic location at the first time;

determining the third device is at a second geographic location at the second time;

determining a first difference between the first time and the second time is less than a first threshold value;

determining, based on the second biometric input, a second feature vector;

determining a similarity value indicative of similarity between the first feature vector and the second feature vector; and determining the similarity value exceeds a second threshold value.

15. The method of claim 11, further comprising:

receiving second data from a third device at a second time, wherein the second data comprises second biometric input;

determining, based on the second data and the exclusion data, a second value indicative of a likelihood of fraud;

the determining the second value comprising:

determining, based on the second biometric input, a second feature vector;

determining a similarity value indicative of similarity between the first feature vector and the second feature vector;

determining the similarity value exceeds a first threshold value;

presenting a second set of prompts using one or more of the third device or a fourth device that is associated with the third device;

receiving a second set of reply data; and determining a correspondence between at least a portion of the first set of reply data and the second set of reply data exceeds a second threshold value.

16. The method of claim 11, further comprising:

determining at least a portion of the exclusion data corresponds to at least a portion of inclusion data, wherein the inclusion data is indicative of an authorized account; and sending a notification to a representative of the authorized account.

17. The method of claim 11, further comprising:

generating, based on the first biometric input, a first set of synthetic training data; and training a first artificial neural network using the first set of synthetic training data.

18. The method of claim 11, further comprising:

training a first artificial neural network with the exclusion data to generate a second value indicative of a likelihood of fraud.

19. A method comprising:

receiving first data from a first device at a first time, wherein the first data comprises first biometric input;

determining, based on the first data, a first value indicative of a likelihood of fraud;

presenting a first set of prompts using one or more of the first device or a second device that is associated with the first device;

receiving a first set of reply data;

determining, based on the first biometric input, second data; and storing as exclusion data one or more of: the first data, the second data, or the first set of reply data.

20. The method of claim 19, further comprising:

presenting a first prompt at a second time;

receiving, at a third time, first reply data that is associated with the first prompt, wherein the first set of reply data comprises the first reply data; and presenting, at a fourth time that is after the third time, a second prompt.

\* \* \* \* \*